Aug. 13, 1957   J. E. BATSTONE   2,802,689
CLAM DIGGING DEVICE
Filed March 30, 1956

James E. Batstone
INVENTOR.

United States Patent Office 2,802,689
Patented Aug. 13, 1957

2,802,689
CLAM DIGGING DEVICE
James E. Batstone, Shelton, Wash.
Application March 30, 1956, Serial No. 575,186
1 Claim. (Cl. 294—50.7)

The present invention relates to a manually usable implement or device which is suitably and therefore expressly designed and constructed to enable one to dig clams.

Although it is perhaps not generally known, some states enforce rather rigid laws in respect to clam digging, for example and insofar as the so-called non-commercial digger is concerned. For instance, the limit for the non-commercial digger in the State of Washington is 24 clams per day. Using present day types of clam guns and shovels, these non-commercial diggers destroy a large percentage of the clams dug. It follows that every season a large percentage of clams, especially razor clams, are inadvertently destroyed and, therefore, unusable. For these and other reasons which need not be mentioned, it is the objective in the instant matter to devise and provide a simple, practical and economical device, to take the place of present-day clam guns and shovels, which will enable the non-commercial clam digger to salvage 85%, more or less, of the clams dug up by him.

In keeping with the laws of the Departments of Fisheries in many states, for example, California, Oregon and Washington, it is another object of the invention to provide an implement wihch will meet with the requirements of the authorities, that is, an implement which is altogether manually usable and operable.

In carrying out a preferred embodiment of the invention an elongate cylinder is provided, the same being substantially closed at its upper end and open at the lower end. An air relief vent, a nipple, for example, is provided on the upper end and this, in conjunction with handle means makes it possible to force and submerge the major portion of the cylinder in the clam hole or bed and, using the same handle means, to withdraw it and to employ the venting nipple in a manner to lift up the load of sand containing the clam and to subsequently release the same in a well-known manner.

Other objects, features and advantages will become more readily apparent from the following description and the accompanying sheet of illustrative drawings.

In the drawings, wherein like numerals are employed to designate similar parts throughout the views.

Figure 1:
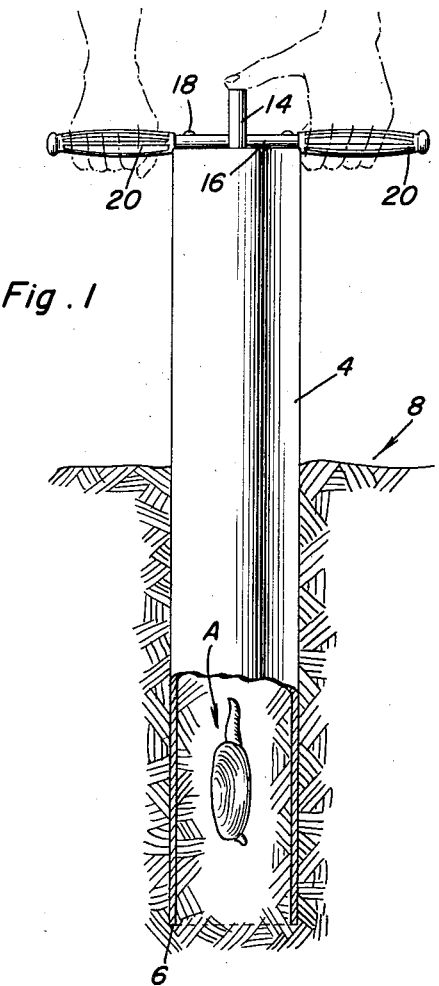
Figure 1 is a side elevational view with portions appearing in section and showing the improved clam digging device and the manner in which it is used.
Figure 3:
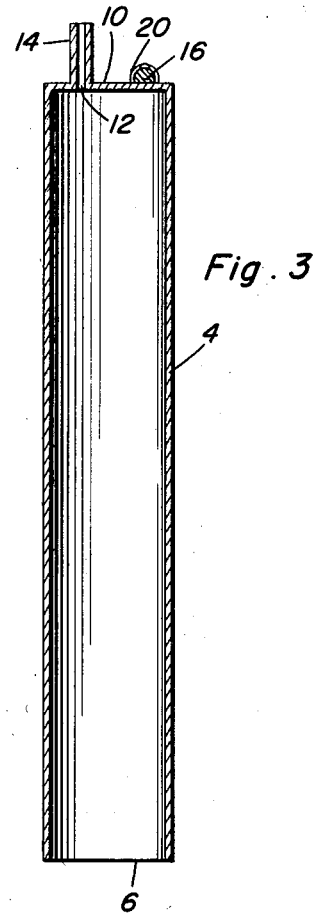
Figure 3 is a vertical section on the line 3—3 of Figure 2 looking in the direction of the arrows and based on the scale of Figure 1.
Figure 2:
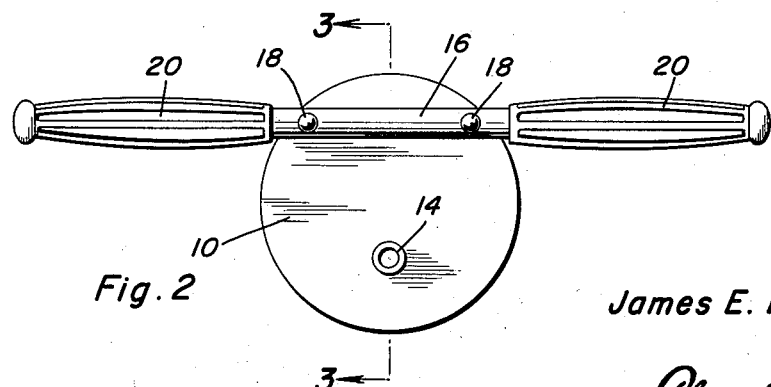
Figure 2 is a plan view of the same on an enlarged scale.

Referring now to the drawing, the invention comprises an elongate hollow tubular body which is preferably a cylinder of uniform cross-section from end-to-end and which is denoted by the numeral 4. The lower or leading end is open as at 6 and is adapted to be forcibly pressed into the clam bed denoted generally by the numeral 8 in Figure 1. The upper end is substantially closed as at 10 except for the air exhausting orifice or vent 12. Extending out from this and formed integral with the top is a relatively small tubular neck or nipple 14 which is adapted to be valved with the thumb in the manner shown in phantom lines in Fig. 1. It will be noticed that this vent or venting niple is disposed to one side of the axial center of the closed end. On the other side thereof is a handle. Actually this comprises a handle bar the intermediate portion 16 of which is superimposed on the flat top and riveted or otherwise anchored in place as at 18. The end portions of the bar extend beyond substantially diametrically opposite sides of the cylinder and are provided with rubber or equivalent hand-grips 20, so that the handle actually is in the form of a fixed handle bar. The body is a lightweight cylinder which in practice would be about 4 inches in diameter and approximately 24 inches in length. Best results have been obtained by using cylinders constructed of brass, galvanized, stainless steel tubing. The closed upper end or top is, of course, air-tight except for the vent. With the handle bar to one side of the center and the venting nipple to the other side the user may catch hold of one hand-grip and use the thumb of the same hand for closing the nipple and effecting a suction or partial vacuum within the upper part of the chamber of the cylinder, or releasing it in a generally obvious manner.

The clam digger, or shovel as it is sometimes called, is used as follows. The handle bar is gripped in the manner illustrated in phantom lines and the lower or leading end of the cylinder is forcibly pressed into the sand or clam hole or bed. During this operation the thumb is, of course, kept off of the venting nipple. The lower end of the cylinder is pushed down into the sand working it back and forth or however the user prefers until it has been sunk some 12 to 18 inches. Then the thumb is placed over the upper end of the nipple and a suction or partial vacuum in the upper portion of the cylinder above the "load" makes it possible to withdraw the device as a unit and to bring the load up with it. When the device has been completely pulled up or withdrawn from the hole, the thumb is released from the nipple and the suction or partial vacuum is in turn released and consequently the load drops onto the beach to permit the clam A to be removed.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the invention as claimed.

What is claimed as new is as follows:

A manually usable clam digging device free of moving parts comprising a vertically elongated rigid cylinder the lower leading end of which is wholly open and adapted to be manually forced down into the fine moist sand over the usual clam hole in said sand and the upper trailing end of which is substantially flat and closed but is provided with an eccentrically positioned finger-controlled air trapping and releasing vent, and handle means embodying a handle bar having its intermediate portion superimposed on and also eccentrically affixed to the closed portion of said upper end and having end portions projecting beyond diametrically opposite portions of the body of the cylinder and provided with hand-grips, said vent being provided with an upstanding nipple disposed within convenient reach of both of said handgrips.

References Cited in the file of this patent
UNITED STATES PATENTS

| | | |
|---|---|---|
| 575,214 | Croskey et al. | Jan. 12, 1897 |
| 1,044,109 | Weaver | Nov. 12, 1912 |
| 1,178,147 | Gardner | Apr. 4, 1916 |
| 1,653,353 | Farmer | Dec. 20, 1927 |
| 1,783,026 | Ober | Nov. 25, 1930 |
| 2,599,087 | Benison | June 3, 1952 |